US011556175B2

(12) United States Patent
Farooq et al.

(10) Patent No.: US 11,556,175 B2
(45) Date of Patent: Jan. 17, 2023

(54) HANDS-FREE VEHICLE SENSING AND APPLICATIONS AS WELL AS SUPERVISED DRIVING SYSTEM USING BRAINWAVE ACTIVITY

(71) Applicant: TOYOTA MOTOR ENGINEERING & MANUFACTURING NORTH AMERICA, INC., Plano, TX (US)

(72) Inventors: Muhamed K. Farooq, Ann Arbor, MI (US); Sean P. Rodrigues, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/234,067

(22) Filed: Apr. 19, 2021

(65) Prior Publication Data

US 2022/0334641 A1  Oct. 20, 2022

(51) Int. Cl.
*G06F 3/01* (2006.01)
*B60K 35/00* (2006.01)

(52) U.S. Cl.
CPC .............. *G06F 3/015* (2013.01); *B60K 35/00* (2013.01); *B60K 2370/119* (2019.05);
(Continued)

(58) Field of Classification Search
CPC ........... A61B 5/163; A61B 5/18; A61B 5/374; A61B 5/375; A61B 5/742; B60K 28/06; B60W 30/143; B60W 40/08; B60W 50/14; B60W 2040/0818; B60W 2050/146; B60W 2540/22; B60W 2540/26; G02B 27/0018;
(Continued)

(56) References Cited

U.S. PATENT DOCUMENTS 7,127,283 B2   10/2006   Kageyama
9,855,945 B2    1/2018   Fung et al.
(Continued)

FOREIGN PATENT DOCUMENTS

CN    108494421 A    9/2018
JP    2019-11632 A   1/2019

OTHER PUBLICATIONS

Chander Prabha, et al., "Precision Enhancement of Driver Assistant System Using EEG Based Driver Consciousness Analysis & Classification", Computational Network Application Tools for Performance Management, Jan. 2020, pp. 247-257 (Abstract only).
(Continued)

*Primary Examiner* — Nelson M Rosario
(74) *Attorney, Agent, or Firm* — Oblon, McClelland, Maier & Neustadt, L.L.P.

(57) ABSTRACT

A device that uses brainwave activity to allow a user to perform hands-free tasks is disclosed. For example, the device can include a transparent display, an electroencephalogram (EEG) sensor, and a processing circuitry coupled to the transparent display and the EEG sensor. The EEG sensor can be configured to sense an EEG signal corresponding to brain activity associated with a user of the device. The processing circuitry can be configured to display a visual stimulus on the transparent display and generate a control signal associated with a task of the user based on the EEG signal. Therefore, the user can use his brainwave activity to perform hands-free tasks.

18 Claims, 6 Drawing Sheets

(52) U.S. Cl.
 CPC .... *B60K 2370/149* (2019.05); *B60K 2370/52* (2019.05); *B60K 2370/592* (2019.05); *B60K 2370/73* (2019.05); *B60K 2370/785* (2019.05)

(58) Field of Classification Search
 CPC ............... G02B 27/01; G02B 27/0101; G02B 2027/0118; G02B 2027/014
 See application file for complete search history.

(56) References Cited

U.S. PATENT DOCUMENTS

| | | | |
|---|---|---|---|
| 10,304,275 | B2 | 5/2019 | Dyne et al. |
| 10,488,925 | B2 | 11/2019 | Li |
| 10,752,252 | B2 | 8/2020 | Fung et al. |
| 2005/0015016 | A1 | 1/2005 | Elitok et al. |
| 2014/0195096 | A1 | 7/2014 | Schliep et al. |
| 2014/0247210 | A1 | 9/2014 | Henderek et al. |
| 2014/0368422 | A1 | 12/2014 | Gupta et al. |
| 2017/0053444 | A1 | 2/2017 | Huang et al. |
| 2017/0305349 | A1* | 10/2017 | Naboulsi ................ B60R 1/025 |
| 2017/0311831 | A1 | 11/2017 | Freer et al. |
| 2018/0072310 | A1 | 3/2018 | Fung et al. |
| 2019/0061525 | A1* | 2/2019 | Ji ........................... A61B 5/374 |
| 2019/0168771 | A1 | 6/2019 | Migneco et al. |
| 2019/0332902 | A1 | 10/2019 | Gallagher et al. |
| 2020/0171950 | A1 | 6/2020 | Wieczorek et al. |
| 2020/0247425 | A1 | 8/2020 | Chou et al. |
| 2021/0398562 | A1* | 12/2021 | Verbeke ............... G11B 27/005 |

OTHER PUBLICATIONS

Luis G. Hernández, et al., "EEG-Based Detection of Braking Intention Under Different Car Driving Conditions", Frontiers in Neuroinformatics, vol. 12, Article 29, May 29, 2018, pp. 1-14.

Mariana Fernandes, et al., "Wearable Brain Cap with Contactless Electroencephalogram Measurement for Brain-Computer Interface Applications", Proceedings of the 4th International IEEE EMBS Conference on Neural Engineering, Conference Paper, Apr. 29-May 2, 2009, pp. 387-390.

* cited by examiner

HANDS-FREE VEHICLE SENSING AND APPLICATIONS AS WELL AS SUPERVISED DRIVING SYSTEM USING BRAINWAVE ACTIVITY

BACKGROUND

Technical Field

The present disclosure is directed to a device and associated method that use brainwave activity to allow a user to perform hands-free tasks, where the device may be disposed in a vehicle.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

An electroencephalogram (EEG) senses electrical responses associated with brainwave activity in a user's brain using electrodes attached to the user's scalp. Contact and contactless EEG sensors can be used for reading the electrical activity associated with the brainwave activity.

A conventional EEG apparatus may use an EEG sensor for monitoring electrical activity generated by the brain of a person, and may be placed in a vehicle. The apparatus may include a processor that analyzes the brainwaves of a person to determine an emotional state, a cognitive load state, and an alertness state. The apparatus can be used to measure brainwave activity that is indicative of any activity; once an activity is sensed, the apparatus can trigger further action corresponding to the activity. The apparatus can also be used to control a variety of devices based on detected metal state

SUMMARY

Aspects of the disclosure provide a device that uses brainwave activity to allow a user to perform hands-free tasks. For example, the device can include a transparent display, an electroencephalogram (EEG) sensor, and a processing circuitry. The EEG sensor can be configured to sense an EEG signal corresponding to brain activity associated with a user of the device. The processing circuitry can be coupled to the transparent display and the EEG sensor and configured to display a visual stimulus on the transparent display and generate a control signal associated with a task of the user based on the EEG signal. For example, the processing circuitry can generate the control signal to cease displaying the visual stimulus on the transparent display. As another example, the processing circuitry can generate the control signal by comparing the EEG signal with a pre-registered EEG signal stored in a database. In an embodiment, the pre-registered EEG signal can include a default EEG signal of the user sensed by the EEG sensor when the user is staring at and aware of the visual stimulus. For example, the database can be a remote database. In another embodiment, the device can further include a receiver coupled to the processing circuitry that is configured to receive the pre-registered EEG signal from the remote database. In yet another embodiment, the device can further include a transmitter coupled to the processing circuitry that is configured to transmit to the remote database the pre-registered EEG signal of the user sensed by the EEG sensor when the user is staring at and aware of the visual stimulus. For example, the EEG sensor can be a contactless EEG sensor. As another embodiment, the EEG sensor can be a contact EEG sensor.

In an embodiment, the device can further include a sensor coupled to the processing circuitry that is configured to sense a stimulus object in a vicinity of the device. The processing circuitry can display the visual stimulus that is associated with the stimulus object on the transparent display. In another embodiment, the device can be disposed in a vehicle that includes a steering system coupled to the processing circuitry that is configured to steer the vehicle. The processing circuitry can display the visual stimulus on the transparent display when the steering system is steering the vehicle.

For example, the EEG signal can correspond to at least one of blinking one or both eyes and thinking of a word. In an embodiment, the visual stimulus can include an icon, and the task can correspond to an operation of a device associated with the icon. For example, the device can include at least one of a phone and a fan, and the operation includes at least one of calling/texting using the phone and turning on/off the fan.

In an embodiment, the device can be disposed in a vehicle that includes a windshield, a rear mirror and side mirrors, and the transparent display can be disposed on at least one of the windshield, the rear mirror and the side mirrors.

The foregoing general description of the illustrative embodiments and the following detailed description thereof are merely exemplary aspects of the teachings of this disclosure, and are not restrictive.

Aspects of the disclosure also provide a method using brainwave activity to allow a user to perform hands-free tasks. For example, the method can include displaying a visual stimulus on a transparent display, sensing an EEG signal corresponding to brain activity associated with a user of the device, and generating a control signal associated with a task of the user based on the EEG signal. For example, the control signal can control that the visual stimulus ceases being displayed on the transparent display.

In an embodiment, generating a control signal includes comparing the EEG signal with a pre-registered EEG signal stored in a remote database. For example, the EEG signal corresponds to at least one of blinking one or both eyes and thinking of a word. As another example, sensing an EEG signal is performed by a contactless EEG sensor.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
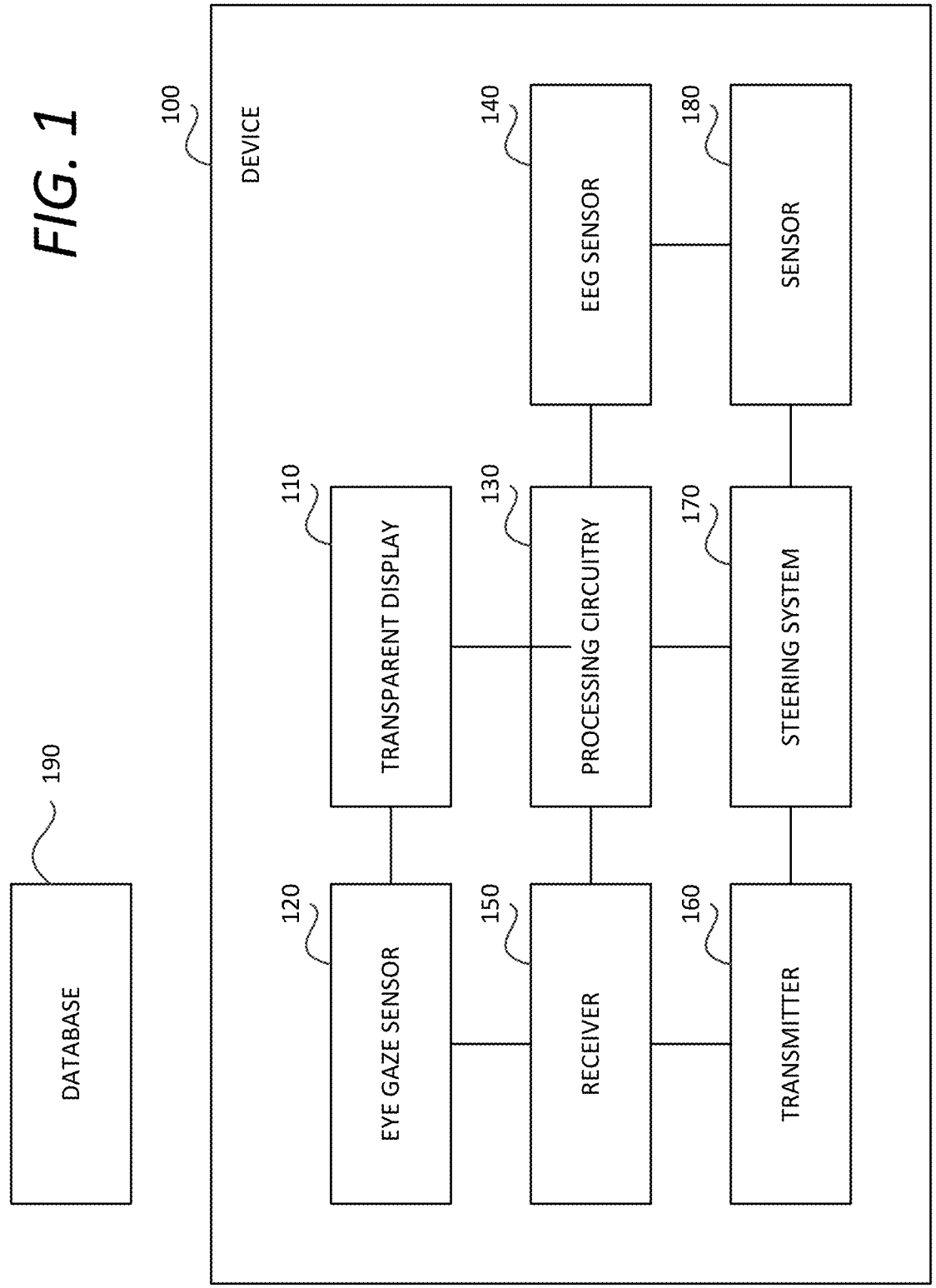
FIG. 1 is a functional block diagram of an exemplary device according to some embodiments of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

A device that uses brainwave activity to allow a user to perform hands-free tasks is described in the disclosure. In an embodiment, the device can be disposed in a vehicle. In another embodiment, the device can be disposed in a restaurant. The device can allow a user to not only select an icon but to perform a variety of tasks based on his brainwave activity. Whether the user is staring at the icon and performs a task can be determined using the brainwave activity. The device can include a transparent display, e.g., a dual-side transparent display, that allows a user of the device to view enhanced or augmented visual stimuli, e.g., an icon and a menu, displayed thereon. The device can also include an EEG sensor that monitors the user's EEG readings, which can be used to determine whether the user is aware of the visual stimuli displayed on the transparent display and performs a task accordingly, e.g., stopping a vehicle when the device is disposed in the vehicle and ordering a meal when the device is disposed in a restaurant. For example, the device can further include a processing circuitry that compares the EEG readings with a pre-registered EEG signal to determine whether the user is aware of the visual stimuli. The pre-registered EEG signal can be stored in a database, e.g., a remote database, and corresponds to a user's brainwave activity as he is asked to stare at images, signs, graphics, icons, etc. that may be displayed on the transparent display. The device can further include an eye gaze sensor that determines the gaze point associated with the user. The processing circuitry can determine whether the gaze point is onto the visual stimulus displayed on the transparent display, and compare an EEG signal generated by the EEG sensor with the pre-registered EEG signal stored in the database when determining that the gaze point is onto the visual stimulus.

Figure 2:
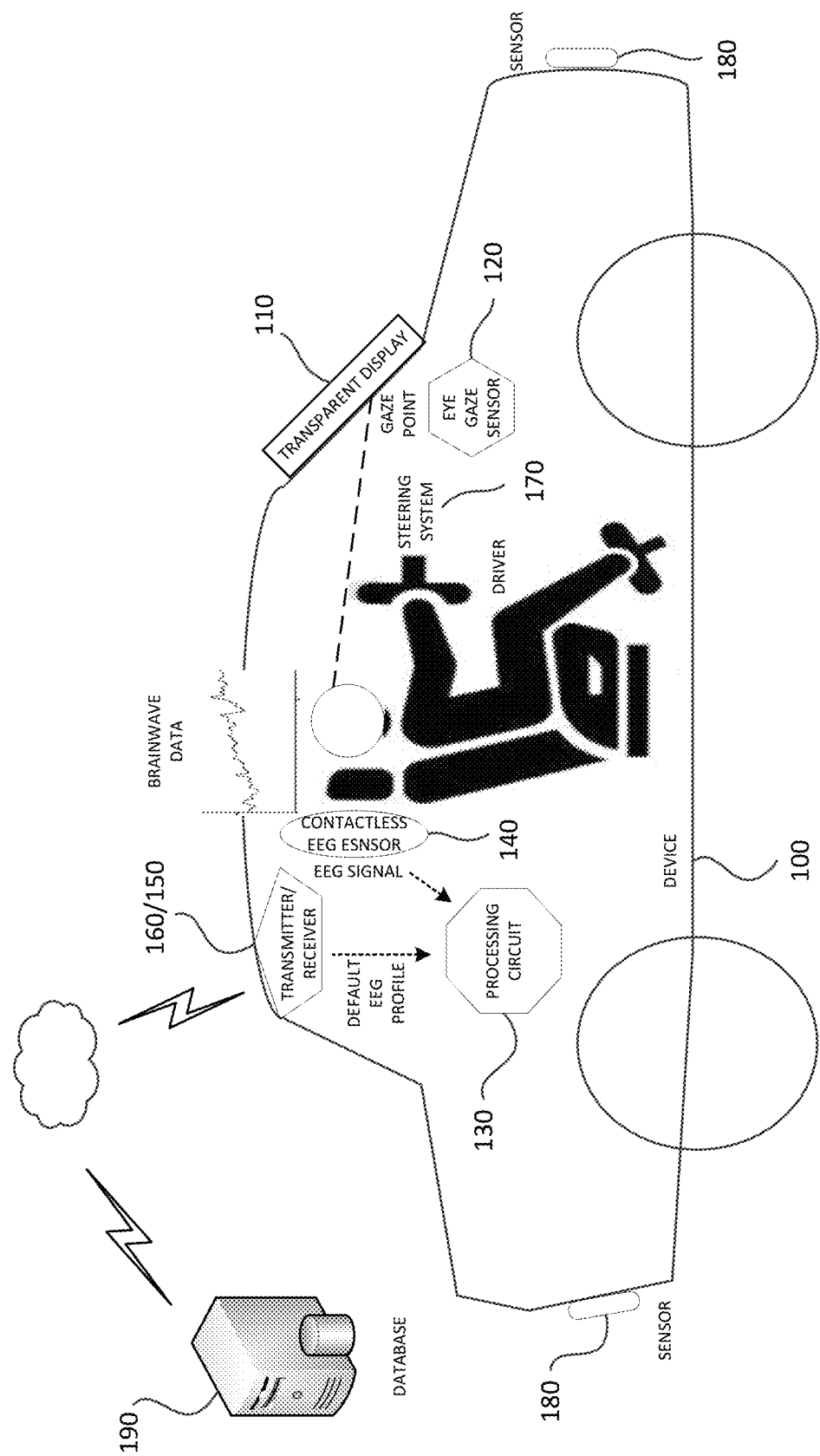
FIG. 2 is a schematic diagram illustrating the functional interaction of exemplary components included in the device according to some embodiments of the disclosure.

FIG. 1 is a functional block diagram of an exemplary device 100 according to some embodiments of the disclosure. FIG. 2 is a schematic diagram illustrating the functional interaction among a variety of components included in the device 100 according to some embodiments of the disclosure. For example, the device 100 can be disposed in a vehicle. In an embodiment, the device 100 can include a transparent display 110, an eye gaze sensor 120, a processing circuitry 130, an electroencephalogram (EEG) sensor 140, a receiver 150, a transmitter 160, a steering system 170 and one or more sensors 180. The device 100 can be wirelessly connected to a database 190. For example, the database 190 can be a remote database 190. As another example, the database 190 can be installed in the device 100.

The transparent display 110 can be a dual-sided transparent display that allows a user of the device 100 disposed in a vehicle, e.g., a driver, to view enhanced or augmented visual stimulus displayed thereon. In an embodiment, a side of the dual-sided transparent display 110 facing the driver can implement augmented reality-type prompts. The transparent display 110 can be disposed on a windshield 390 (see FIG. 3), a rear mirror 680 (see FIG. 6) and/or side mirrors 690 (see FIG. 6) of the vehicle. The transparent display 110 can allow for the display of images or icons to the driver without obstructing the driver's view of the driving environment. The eye gaze sensor 120 can project a pattern of infrared or near-infrared non-collimated light on the driver's eyes, and capture an image of the driver's eyes during a fixation or smooth pursuit. Machine learning, image processing and mathematical algorithms can be used to process the captured image and determine the gaze direction and gaze point of the driver. The eye gaze sensor 120 can also analyze the driver's cognitive intent, interest and salience based on a series of fixations and saccades of eye movements called a scanpath. The eye gaze sensor 120 can also determine whether a driver is a novice or a veteran. For example, when driving a vehicle along a bend of a narrow road with some vehicles parked alongside, an experienced driver will check the curve of the road and concentrate on the location where an oncoming vehicle could be seen, while a new driver concentrates his view on the parked vehicle and estimates his distance to the parked vehicle.

The EEG sensor 140 can sense brainwave activity of a driver. Typically, the EEG sensor 140 can measure electrical signals created by the brainwave activity of neurons near the surface of the brain over a period of time. For example, the EEG sensor 140 can measure small fluctuations in electrical impulses between the scalp and a plurality of metal electrodes, amplify the electrical impulses, bandpass filter the amplified electrical impulses, and use an algorithm, e.g., Fast Fourier Transform (FFT), to identify EEG signals as distinct waves with different frequencies.

EEG brainwaves can be divided into a plurality of EEG bands, including delta waves with frequencies ranging from 1 to 4 Hz, theta waves with frequencies ranging from 4 to 7 Hz, alpha waves with frequencies ranging from 7 to 13 Hz and beta waves with frequencies ranging from 14 to about 30 Hz, which can occur at different portions of the brain and indicate specific meanings. For example, delta waves can occur frontally in adults and posteriorly in children. As another example, theta waves are commonly encountered in the frontocentral regions of the brain and are usually related to drowsiness or heightened emotional states, while beta waves are most closely associated with being conscious or in an awake, attentive and alert state. Besides, alpha waves, theta waves and beta waves have higher power spectral density (PSD) in the drowsy state than in the awake state. Drowsiness is one of the highest causes in accidents. The EEG brainwaves can also correspond to the driver's mood or emotion change (e.g., relaxed to stressed), rise in attentiveness or cognitive load (e.g., drowsy to alert), state change (e.g., distracted to focused), etc.

The EEG brainwaves can also be used to determine if a driver has seen and is aware of visual stimuli, e.g., warnings, images or icons, displayed on the transparent display 110 and has performed some tasks in response. For example, the driver, when looking at the visual stimuli, can alter his brainwave signals by performing certain actions, e.g., blinking as a way to click or double click the icon, in order to perform corresponding hand-free tasks.

The EEG sensor 140 can be contactless or contact. The contact EEG sensor 140, e.g., a headset EEG sensor, can include wet electrodes that are connected with the scalp by applying conductive gel or saline into the pocket of each of the electrodes. The contact EEG sensor 140 can also include dry electrodes that are in direct contact with the scalp without the use of any electrolytic substance. The contactless EEG sensor 140 can detect a driver's interest and attention based on the driver's brainwave data it senses, without touching the driver. In an embodiment, the contactless EEG sensor 140 can be disposed on a headrest of a driver seat of the vehicle.

The steering system 170 can be used to steer the vehicle to follow the desired course. For example, a driver can operate a steering wheel of the steering system 170 to turn the front wheels of the vehicle.

The sensors 180 can be disposed to detect stimulus objects, e.g., pedestrians and vehicles, in the vicinity of the device 100. In an embodiment, the sensors 180 can include cameras, LiDAR, radar and the like. For example, LiDAR can measure the distance between a stimulus object from the device 100 by projecting pulsed laser light on the stimulus object and measuring the time the reflection of the light takes to return to the sensors 180. Accordingly, the vehicle with the device 100 disposed therein can function as a semi-autonomous vehicle and be capable of sensing its surrounding environment and controlling braking, steering, or the like during a potential accident.

The processing circuitry 130 can be coupled to the transparent display 110, the eye gaze sensor 120, the EEG sensor 140, the sensor 180 and the steering system 170. The processing circuitry 130 can highlight the stimulus objects detected by the sensors 180 and display visual stimulus corresponding to the stimulus objects on the transparent display 110 to get the driver's attention or alert the driver. The processing circuitry 130 can analyze the gaze point and the gaze direction to determine whether the driver's gaze point is onto the visual stimulus. The processing circuitry 130 can also analyze the EEG signal generated by the EEG sensor 140 to determine whether the driver is aware of the visual stimulus displayed on the transparent display 110 and performs a task, and generate a control signal associated with the task. For example, the processing circuitry 130 can compare the EEG signal with a pre-registered EEG signal stored in the database 190.

In an embodiment, the processing circuitry 130 can a central processing unit (CPU) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Alternatively, the CPU in the processing circuitry 130 can execute a computer program including a set of computer-readable instructions, the program being stored in any non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The database 190 can be in wireless communication with the device 100. The database 190 can store the pre-registered EEG signals of multiple drivers. The pre-registered EEG signals can be created and mapped to specific response, functions and requests of the driver. The drivers can set up their respective pre-registered EEG signals with EEG baseline readings so the drivers can be identified based on the pre-registered EEG signals. For example, the EEG data can be collected as the drivers are asked to look at images, signs, graphics, icons, etc. that may be displayed on the transparent display 110. The collected EEG data can then be conditioned and normalized to become the pre-registered EEG signals to enhance the processing circuitry's 130 ability to distinguish changes to the pre-registered EEG signals. A variety of icons may be displayed on the transparent display 110 with a variety of attributes (e.g., color, size, flashing rate, etc.), and the order that the driver looks at the variety of icons and how his brain responds to them will generate a set of EEG data that the device 100 may associate a response to. The database 190 may include a relational database, an object-oriented database, a NoSQL database, or any other type of database suitable for providing storage and retrieval of the pre-registered EEG signal from the device 100.

The receiver 150 can be coupled to the processing circuitry 130 and configured to receive the pre-registered EEG signal from the remote database 190. The transmitter 160 can also be coupled to the processing circuitry 130 and configured to transmit the pre-registered EEG signals of the multiple drivers to the remote database 190. The device 100 may use information from vehicle-to-vehicle (V2V) communication, vehicle-to-infrastructure technology (V2I), infrastructure-to-vehicle (V2I/I2V) communication and/or drive-by-wire systems to navigate the vehicle.

Figure 3:
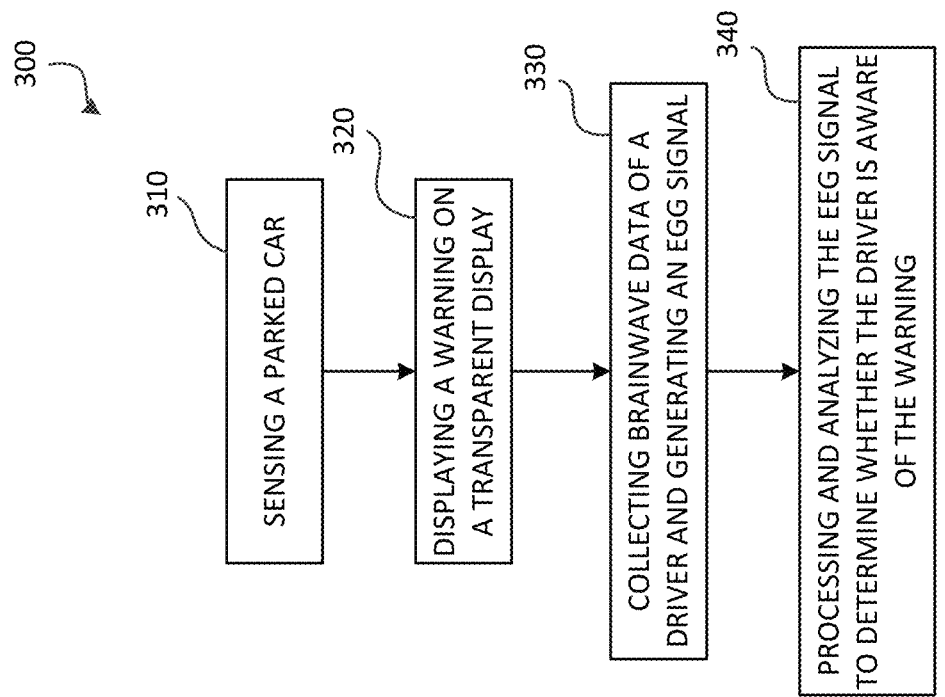
FIG. 3 is a schematic diagram illustrating a first exemplary application scenario of the device according to some embodiments of the disclosure.
Figure 3:
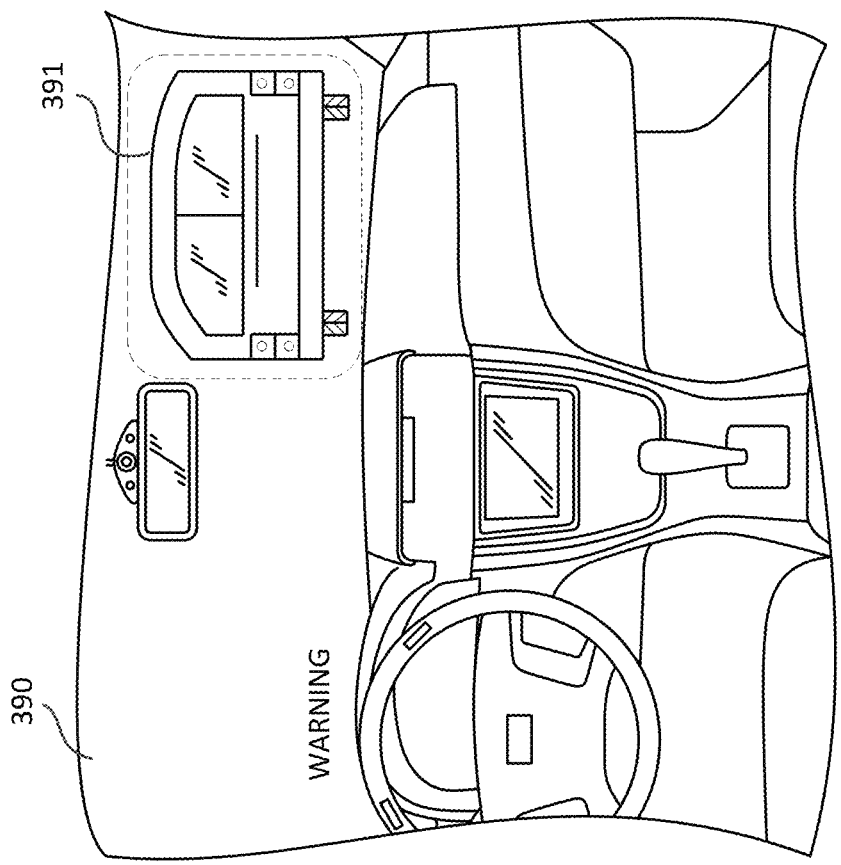

FIG. 3 is a schematic diagram illustrating a first exemplary application scenario 300 of the device 100 according to some embodiments of the disclosure. For example, the device 100 can be disposed in a vehicle. In an embodiment, the sensor 180 can sense that the vehicle is approaching a pedestrian or a parked car 391 on the street and there is a possibility for collision, as indicated at step 310. The processing circuitry 130 can then display a warning on the transparent display 110 and/or highlight the parked car 391 to trigger the driver's attention, as indicated at step 320. The transparent display 110 can be disposed on a windshield 390 of the vehicle. The warning and the highlighted parked car 391 can be referred to as a visual stimulus for the driver. The EEG sensor 140 can collect brainwave data of the driver of the vehicle (or the user of the device 100) in real time and generate an EEG signal corresponding to the brain activity associated with the driver, as indicated at step 330. The processing circuitry 130 can process and analyze EEG signal to determine whether the driver is aware of the warning and/or the highlighted parked car 391, and generate a control signal, as indicated at step 340. For example, the processing circuitry 130 can compare the EEG signal with the pre-registered EEG signal stored in the database 190 to determine whether the driver is aware of the warning and/or the highlighted parked car 391 and generate the control signal.

For example, the receiver 150 can receive the pre-registered EEG signal from the remote database 190, and the processing circuitry 130 can compare whether the EEG signal generated by the EEG sensor 140 matches a default EEG signal included in the pre-registered EEG signal that corresponds to brain activity associated with the driver of the vehicle when the processing circuitry 130 is displaying the warning on the transparent display 110 and the driver is staring at and aware of the warning and/or the highlighted parked car 391. In an embodiment, when determining that the driver is aware of the warning and/or the highlighted parked car 391, the processing circuitry 130 can generate the control signal that ceases displaying the warning on the transparent display 110 and/or highlighting the parked car 391. In another embodiment, when determining that the driver is not aware of the warning and/or the highlighted parked car 391, the processing circuitry 130 can generate the control signal that controls the transparent display 110 to flash the warning and/or change the color of the warning, controls a speaker to make a sound, controls the steering system 170 to steer the vehicle away from the parked car 391, or even controls the vehicle to stop. In an embodiment, instead of each icon having one steady frequency associated with it, each icon can emit one frequency for a certain amount of time, another frequency for another pre-determined amount of time, and so on to prevent false clicks, e.g., the navigation icon emits 8 Hz for 2 seconds, followed by 16 Hz for 2 seconds, followed by 8 Hz for 2 seconds, etc.

In an embodiment, the eye gaze sensor 120 can capture an image of at least one eye of the driver and determine a gaze point associated with the driver according to the image, and the processing circuitry 130 can determine whether the gaze point is onto the visual stimulus and generate the control signal when the gaze point is onto the visual stimulus. For example, the processing circuitry 130 does not compare the EEG signal with the pre-registered EEG signal stored in the remote database 190 until determining that the gaze point is onto the visual stimulus.

Figure 4:
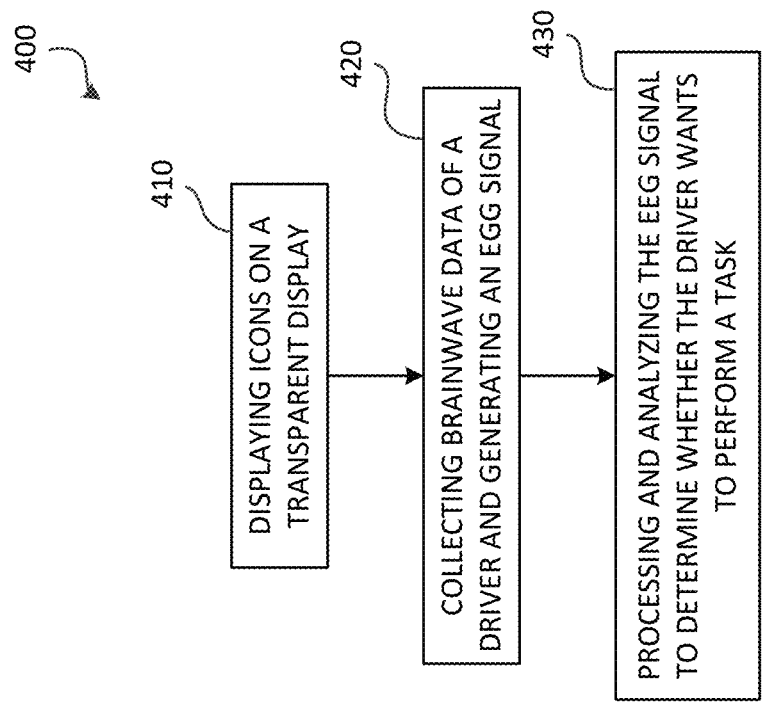
FIG. 4 is a schematic diagram illustrating a second exemplary application scenario of the device according to some embodiments of the disclosure.
Figure 4:
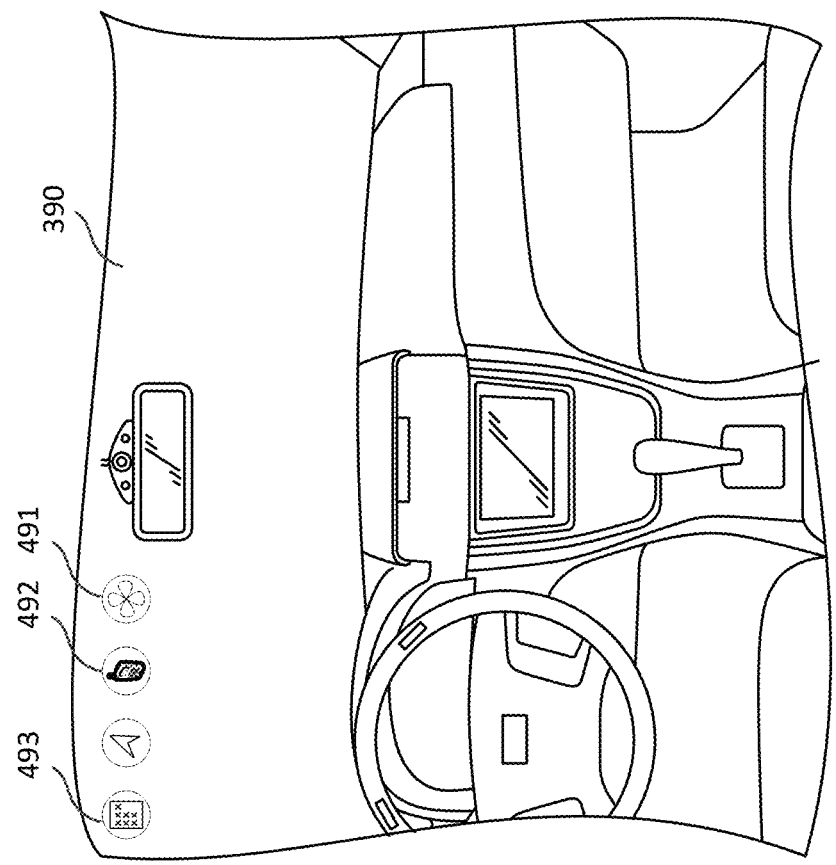

FIG. 4 is a schematic diagram illustrating a second exemplary application scenario 400 of the device 100 according to some embodiments of the disclosure. In an embodiment, the processing circuitry 130 can display a variety of icons on the transparent display 110, as indicated at step 410. For example, the icons can include a fan icon 491, a phone icon 492 and a text icon 493. The EEG sensor 140 can collect brainwave data of the driver of the vehicle (or the user of the device 100) and generate an EEG signal corresponding to the brain activity associated with the driver, as indicated at step 420. The processing circuitry 130 can then process and analyze the EEG signal to determine whether the driver wants to perform a task, and generate a control signal associated with the task, as indicated at step 430. For example, the processing circuitry 130 can compare the EEG signal with the pre-registered EEG signal stored in the database 190 to determine whether the driver wants to perform a task and generate the control signal associated with the task.

For example, the driver can perform a task, e.g., navigating through a menu, closing a warning or alert, changing channels, answering calls, or choosing an icon, by blinking his one or both eyes a certain number of times (e.g., three or four times) or performing a cognitive action (e.g., thinking of a word), the EEG sensor 140 can sense an EEG signal corresponding to brain activity associated with the driver's blinking eyes and cognitive action, and the processing circuitry 130 can compare the EEG signal with the pre-registered EEG signal and generate a control signal when the EEG signal matches a default EEG signal included in the pre-registered EEG signal. For example, the control signal can control a fan to be turned on/off, and a phone to make a phone call or send a message.

In an embodiment, the eye gaze sensor 120 can determine the gaze point associated with the driver, and the processing circuitry 130 can determine whether the gaze point is onto the visual stimulus and generate the control signal when the gaze point is onto the visual stimulus. For example, when determining that the gaze point is onto the fan icon 491, the phone icon 492 or the text icon 493, the processing circuitry 130 can compare the EEG signal (e.g., that can correspond to the driver's eyes blinking three times or four times or the driver's cognitive action) with the pre-registered EEG signal to determine whether to turn on/off the fan, make a phone call or send a message.

Figure 5:
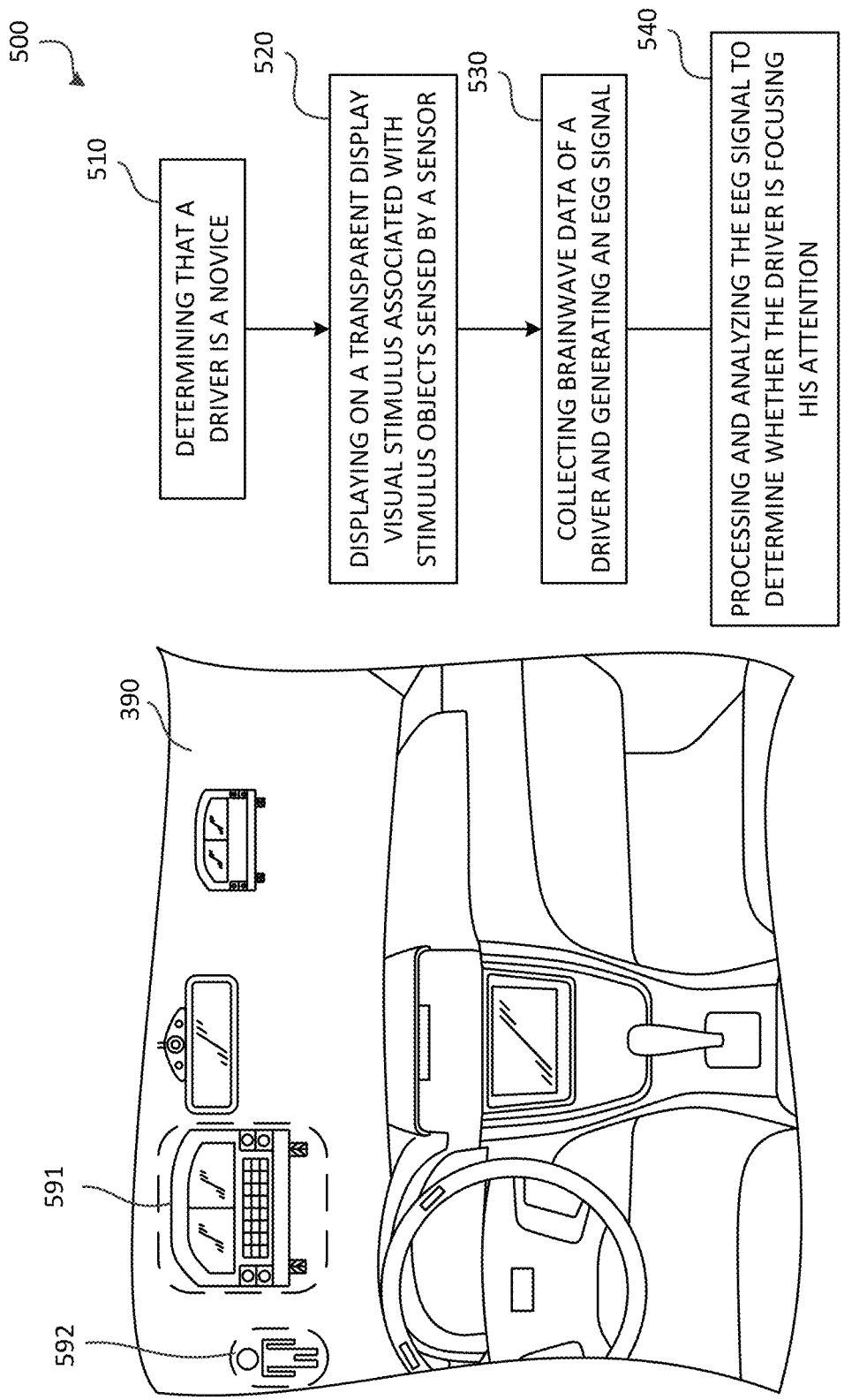
FIG. 5 is a schematic diagram illustrating a third exemplary application scenario of the device according to some embodiments of the disclosure.

FIG. 5 is a schematic diagram illustrating a third exemplary application scenario 500 of the device 100 according to some embodiments of the disclosure. In an embodiment, the eye gaze sensor 120 can determine whether the driver of the vehicle is a novice or a veteran, as indicated at step 510. When the eye gaze sensor 120 determines that the driver is a new driver, the processing circuitry 130 can highlight different objects, e.g., a car 591 and a pedestrian 592, on the road sensed by the sensors 180 to teach the new driver where to focus his attention, as indicated at step 520, as the driver's vision may be obstructed by the A-pillar of the vehicle. The EEG sensor 140 can collect brainwave data of the driver of the vehicle and generate an EEG signal corresponding to the brain activity associated with the driver, as indicated at step 530. The processing circuitry 130 can process and analyze the EEG signal to determine whether the new driver is focusing his attention on the visual stimulus 591 and 592, and generate a control signal, as indicated at step 540. For example, the processing circuitry 130 can compare the EEG signal with the pre-registered EEG signal stored in the database 190 to determine whether the new driver is focusing his attention on the visual stimulus 591 and 592 and generate a control signal. For example, the EEG signal generated by the EEG sensor 140 may matches a default EEG signal included in the pre-registered EEG signal that corresponds to brain activity associated with the driver of the vehicle when he is focusing his attention on the visual stimulus, e.g., the highlighted objects 591 and 592, that the processing circuitry 130 displays on the transparent display 110.

In an embodiment, when determining that the driver is focusing his attention on the highlighted objects 591 and 592, the processing circuitry 130 can generate the control signal that ceases highlighting the objects 591 and 592. In another embodiment, when determining that the driver is not focus his attention, the processing circuitry 130 can generate the control signal that controls the transparent display 110 to flash the highlighted objects 591 and 592, controls a speaker to make a sound, controls the steering system 170 to steer the vehicle away from the car 591 and the pedestrian 592, or even controls the vehicle to stop.

In an embodiment, the eye gaze sensor 120 can determine the gaze point associated with the driver, and the processing circuitry 130 can determine whether the gaze point is onto the visual stimulus 591 and 592 and generate the control signal when the gaze point is onto the visual stimulus 591 and 592.

Figure 6:
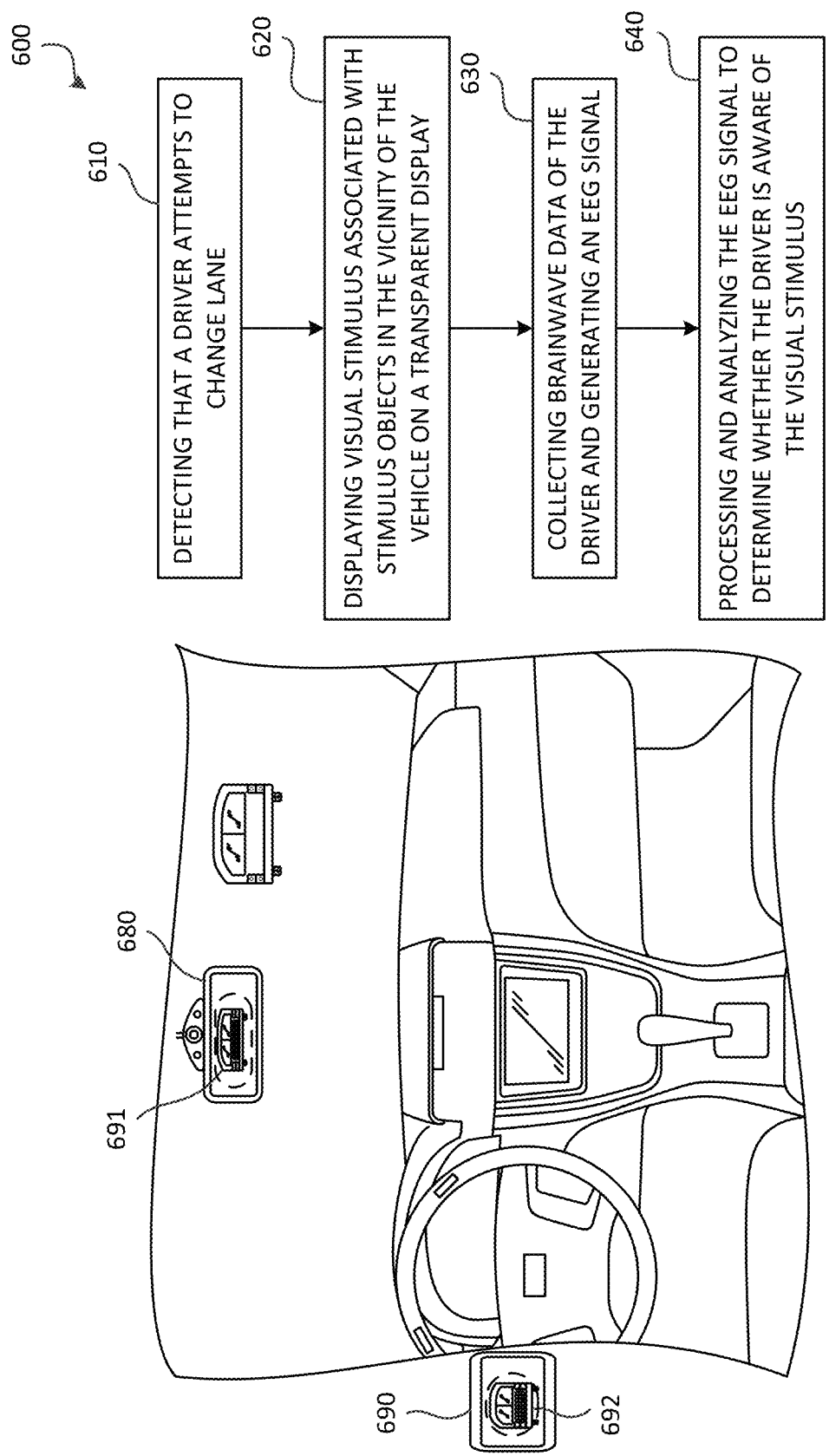
FIG. 6 is a schematic diagram illustrating a fourth exemplary application scenario of the device according to some embodiments of the disclosure.

FIG. 6 is a schematic diagram illustrating a fourth exemplary application scenario 600 of the device 100 according to some embodiments of the disclosure. In an embodiment, the processing circuitry 130 can detect that the driver attempts to change lane using the steering system 170 and does not notice a vehicle in his blind spot, as indicated at step 610. For example, the processing circuitry 130 can detect that driver is going to change lane when he is turning on the turn signal. The sensor 180 can sense a stimulus object in the vicinity of the device 100, e.g., a car running at the rear, left side of the vehicle.

The processing circuitry 130 can then displays a visual stimulus associated with the sensed stimulus object on the transparent display 110 by highlighting the stimulus object, as indicated at step 620. For example, the transparent display 110 can be disposed on a rear mirror 680 and/or side mirrors 690 of the vehicle, and visual stimuli 691 and 692 associated with the sensed stimulus object can be displayed on the rear mirror 680 and the side mirrors 690, respectively.

The EEG sensor 140 can collect brainwave data of the driver of the vehicle and generate an EEG signal corresponding to the brain activity associated with the driver, as indicated at step 630. The processing circuitry 130 can process and analyze the EEG signal to determine whether the driver is aware of and focusing his attention on the visual stimulus 691 and 692, as indicated at step 640. For example, the processing circuitry 130 can compare the EEG signal with the pre-registered EEG signal stored in the database 190 to determine whether the driver is aware of and focusing his attention on the visual stimulus 691 and 692. For example, the EEG signal generated by the EEG sensor 140 may matches a default EEG signal included in the pre-registered EEG signal that corresponds to brain activity associated with the driver of the vehicle when he is focusing his attention on the visual stimuli, e.g., the highlighted objects 691 and 692, that the processing circuitry 130 displays on the transparent display 110.

In an embodiment, when determining that the driver is focusing his attention on the visual stimuli 691 and 692, the processing circuitry 130 can generate the control signal that ceases highlighting the stimulus object. In another embodiment, when determining that the driver does not focus his attention on the visual stimuli 691 and 692, the processing circuitry 130 can generate the control signal that controls the transparent display 110 to flash the visual stimuli 691 and 692 or controls a speaker to make a sound to alert the driver.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered. The hardware elements described in this disclosure may be realized by various circuitry elements, known to those skilled in the related art.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on units or hardware not identical to those described. Accordingly, other implementations are within the scope that may be claimed.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with the processing circuitry 130 and an operating system such as Microsoft Windows 7, UNIX, Solaris, LINUX, Apple MAC-OS and other systems known to those skilled in the art.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

What is claimed is:

1. A device using brainwave activity to allow a user to perform hands-free tasks, the device comprising:
   a transparent display;
   an electroencephalogram (EEG) sensor configured to sense an EEG signal corresponding to brain activity associated with a user of the device;
   a processing circuitry coupled to the transparent display and the EEG sensor, the processing circuitry configured to display a visual stimulus on the transparent display and generate a control signal associated with a task of the user based on the EEG signal, the visual stimulus being a highlighting on the transparent display of an object outside the vehicle and in the vicinity of the vehicle; and
   a sensor coupled to the processing circuitry that is configured to sense the object that is outside the vehicle and in the vicinity of the device,
   wherein the processing circuitry is further configured to determine, based on the EEG signal, whether the user is viewing the object that is highlighted on the transparent display,
   the processing circuitry generates the control signal by comparing the EEG signal with a pre-registered EEG signal stored in a database, and
   the pre-registered EEG signal to which the EEG signal is compared is selected from multiple pre-registered EEG signals stored in the database based on the visual stimulus.

2. The device of claim 1, wherein the device is disposed in a vehicle that includes a steering system coupled to the processing circuitry that is configured to steer the vehicle, and the processing circuitry displays the visual stimulus on the transparent display when the steering system is steering the vehicle.

3. The device of claim 1, wherein the pre-registered EEG signal includes a default EEG signal of the user sensed by the EEG sensor when the user is staring at and aware of the visual stimulus.

4. The device of claim 1, wherein the database is a remote database.

5. The device of claim 4, further comprising:
   a receiver coupled to the processing circuitry that is configured to receive the pre-registered EEG signal from the remote database.

6. The device of claim 4, further comprising:
   a transmitter coupled to the processing circuitry that is configured to transmit the pre-registered EEG signal to the remote database.

7. The device of claim 1, wherein the EEG signal corresponds to the user performing at least one of blinking one or both eyes and thinking of a word.

8. The device of claim 1, wherein the visual stimulus further includes an icon, and the task corresponds to an operation of a device associated with the icon.

9. The device of claim 8, wherein the device includes at least one of a phone and a fan, and the operation includes at least one of calling/texting using the phone and turning on/off the fan.

10. The device of claim 1, wherein the processing circuitry generates the control signal to cease displaying the visual stimulus on the transparent display.

11. The device of claim 1, wherein the device is disposed in a vehicle that includes a windshield, a rear mirror and side mirrors, and the transparent display is disposed on at least one of the windshield, the rear mirror and the side mirrors.

12. The device of claim 1, wherein the EEG sensor is a contactless EEG sensor.

13. The device of claim 1, wherein the EEG sensor is a contact EEG sensor.

14. The device of claim 1, wherein the object that is outside the vehicle and in the vicinity of the vehicle is at least one of another vehicle and a pedestrian.

15. A method using brainwave activity to allow a user to perform hands-free tasks while in a vehicle, comprising:

sensing an object that is outside the vehicle and in the vicinity of the vehicle;

displaying a visual stimulus on a transparent display, the visual stimulus being a highlighting on the transparent display of the object outside the vehicle and in the vicinity of the vehicle;

sensing an EEG signal corresponding to brain activity associated with a user of the method; and generating a control signal associated with a task of the user based on the EEG signal; and determining whether the user is viewing the object that is highlighted on the transparent display based on the EEG signal, the processing circuitry generates the control signal by comparing the EEG signal with a pre-registered EEG signal stored in a remote database, and the pre-registered EEG signal to which the EEG signal is compared is selected from multiple pre-registered EEG signals stored in the remote database based on the visual stimulus.

16. The method of claim 15, wherein the EEG signal corresponds to the user performing at least one of blinking one or both eyes and thinking of a word.

17. The method of claim 15, wherein the control signal controls that the visual stimulus ceases being displayed on the transparent display.

18. The method of claim 15, wherein sensing an EEG signal is performed by a contactless EEG sensor.

* * * * *